Feb. 12, 1952  F. PERRUCA  2,585,830
AUTOMATIC AXIAL PRESSURE DEVICE
APPLICABLE TO FRICTION DRIVES
Filed Feb. 4, 1948  2 SHEETS—SHEET 1

INVENTOR
FELIX PERRUCA
By:
Haseltine, Lake & Co
AGENTS

INVENTOR
FELIX PERRUCA
BY:
Nauetine, Lake & C.
AGENTS

Patented Feb. 12, 1952

2,585,830

UNITED STATES PATENT OFFICE 2,585,830

AUTOMATIC AXIAL PRESSURE DEVICE APPLICABLE TO FRICTION DRIVES

Felix Perruca, Saint-Etienne, France, assignor to Societe des Fabrications Unicum, Paris, France Application February 4, 1948, Serial No. 6,185
In France February 8, 1947

2 Claims. (Cl. 74—208)

The subject of this invention is an automatic axial pressure device, especially intended to be applied to mechanisms for transmitting power by friction, such as variable ratio friction drives. In such drives the power has been transmitted from a driving shaft to a driven shaft by smooth balls or rollers interposed between, and in rolling frictional contact with, substantially disc-shaped members secured to, and rotating with, the said shafts. The power transmitted by such a drive is a function of the axial pressure between the said members and the said balls or rollers. Excessive pressure will cause undue stresses and wear of these parts, while insufficient pressure will result in a reduction of the power transmitted.

The purpose of the present invention is to provide means for automatically maintaining this pressure at its optimum value, i. e. at the lowest value consistent with the transmission, to the driven shaft, of the torque required.

According to the present invention a means for automatically varying the axial pressure between the rotating members of mechanisms for transmitting torque by friction, e. g. variable ratio friction drives, comprises a device, adapted to vary the said pressure directly as the torque transmitted, interposed between a friction-driven member and the shaft to which said member is normally secured.

For a more ready comprehension of the present invention reference may be had to the accompanying drawings, which, however, are given by way of example and are not intended to constitute any limitation, and in which.

Figure 1:
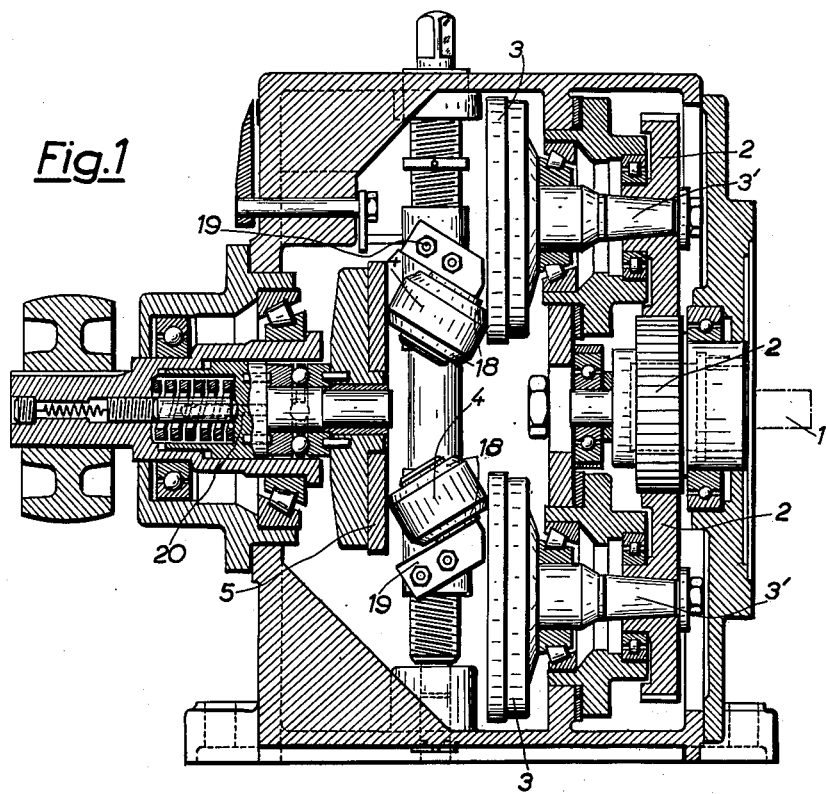
Figure 1 is a general view, in elevation and in part section, of a variable ratio friction drive equipped with the axial pressure device.
Figure 2:
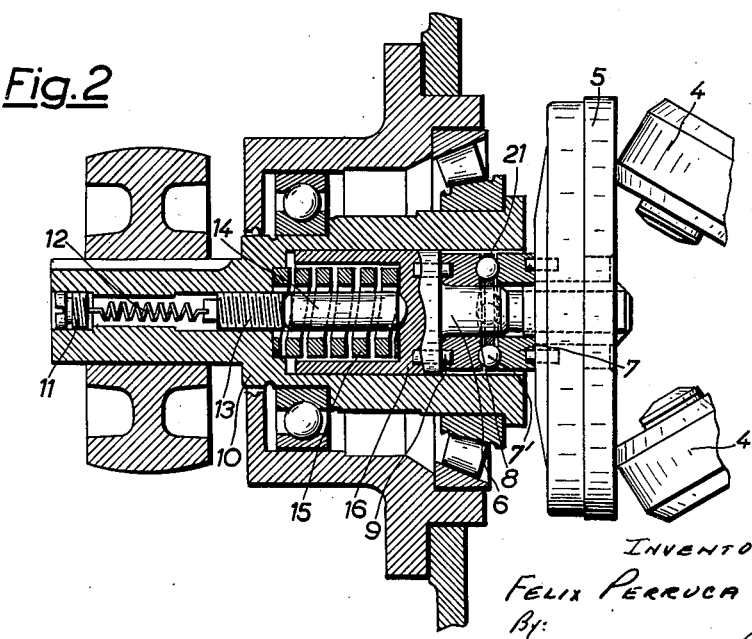
Figure 2 shows on a larger scale a sectional view of the axial pressure device applied to the driven shaft.
Figure 3:
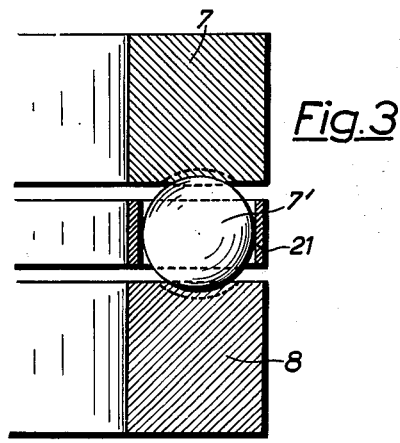
Figure 3 is a detailed radial sectional view of the device with the annuli in the spaced out position.
Figure 4:
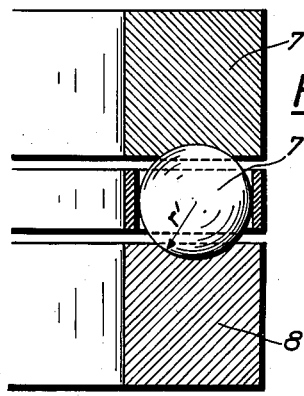
Figure 4 shows on a larger scale a radial sectional view of the device with the annuli in the minimum spaced position.
Figure 6:
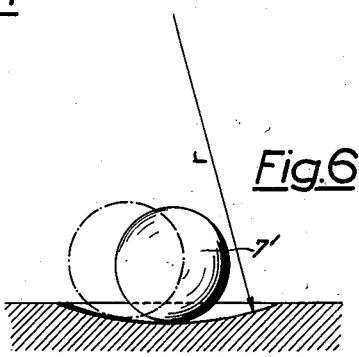
Figure 6 is an enlarged elevational and sectional view along the circle of radius R, showing the axial displacement of a ball resulting from its circular displacement in its supporting groove.

In the embodiment illustrated in Figures 1 and 2 of the accompanying drawings, the device is shown applied to a variable ratio friction drive.

A driving shaft 1 is geared via pinions 2 to the shafts 3', said shafts 3' each having secured to the end of said shaft remote from the shaft 1 a substantially disc-shaped member 3. The circular faces of the said members 3 are co-planar. A driven shaft 10 has secured to it a further substantially disc-shaped member 5, the circular face of said member opposed to the members 3 lying in a plane parallel to the said plane through the circular faces of the members 3.

Interposed between the member 5 and the members 3 and in rolling frictional contact with the said members are two smooth rollers 4 having chamfered annular faces 18 which make the said rolling frictional contact. The rollers 4 are supported for free rotation on spindles secured to brackets 19, the said brackets being adapted to move the said rollers symmetrically across the faces of the said members 3 and 5, thereby varying the speed ratio of the driving shaft 1 to the driven shaft 10.

Since the foregoing is well known in the art and forms no part of the present invention, per se, it is not proposed to describe it in further detail.

The new device comprises essentially two like annuli 7 and 8, one of which, 7, is secured co-axially to the said driven member 5, and the other, 8, secured co-axially to a further member 16, the said member 16 abutting against one end of a helical spring 15, the other end of said spring abutting against the shaft 10, the whole assembly being co-axial with the said shaft 10 and the member 5. Between the said annuli are interposed smooth balls 7', contained in a cage 21 in the known manner. The opposing faces of the annuli 7 and 8 have grooves 22 thereon, hereinafter described in detail, co-operating with the said balls. The shaft 10 has a co-axial cylindrical recess into which the said member 16 is journalled, the member 16 having a co-axial spigot 6 journalled in to the member 5, said member 16 being constrained to rotate with said shaft by a key 20 (see Figure 1).

The annulus 7 is secured to the member 5 by any known means, indicated generally at 17 in Figure 2.

The annulus 8 is a snug fit about the base of the spigot 6 and is secured to the member 16 by means generally indicated at 9 (Figure 2). In the end of the member 16 remote from the said spigot is a co-axial cylindrical recess in which is disposed a helical spring 15 of square section adapted to urge the said member 16 in an axial direction, thus applying axial pressure, through the medium of the annulus 8, balls 7' and annulus 7, to the member 5.

When torque is applied to the member 5 the said member turns through a fraction of a revolution on the spigot 6, rotating the annulus 7 secured to the said member 5 with respect to the annulus 8 secured to the said member 16, said member 16 being constrained to rotate with the shaft 10 by the key 20 hereinbefore described. The grooves 22 are so constructed that relative rotation of the annuli forces the balls against inclined surfaces of the said grooves thus forcing the annuli apart. This movement is yieldingly opposed by the spring 15, hence the effect of applying increasing torque to the member 5 is to increase the axial pressure urging the said member against the smooth rollers 4, thereby increasing the friction between the said rollers 4 and the members 3 and 5, and hence the torque that can be transmitted.

A stop is provided, comprising an axially disposed rod 14 with hemispherical ends, one of which is seated in an axial depression in the member 16, the other end of said rod seating in a similar depression in the end of the screw 13. The screw 13 has a coarse pitch thread and is disposed in an axial correspondingly threaded hole in the shaft 10. The said hole extends axially to the end of the said shaft remote from the member 5 where the said hole is threaded to co-operate with the threads of a screw plug 11. A torsion spring 12 is secured by one end to the plug 11 and by the other end to the screw 13 and is adapted to urge the said screw and hence the rod 14 against the member 16.

A steady increase in torque will feed the member 16 against the stop with considerable force and the screw 13 by virtue of its coarse thread, will be urged away from said member relatively slowly, against the action of the spring 12. An increase of torque of short duration, however, will not affect the stop. The action of the stop 14 is to minimize movement of the member 16 and resulting changes of axial pressure on the member 5 consequent upon fluctuations in torque of short duration.

Figure 5:
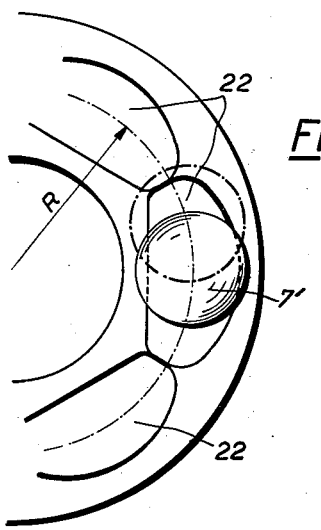
Figure 5 is an enlarged plan view of the special grooves which serve as runways for the balls interposed between the annuli.

The grooves 22 are of definite contour and are disposed circumferentially adjacent each other (Figure 5). The said contour is derived as follows:

(1) In radial cross-section the groove is a secant of a circle of the same radius ($r^1$) as the balls used therewith.

(2) In vertical cross-section along the circumference of the circle radius R (Figure 5) the groove is a secant of a circle of large radius (r), compared with the radius of the said balls. The fulfilment of these two conditions defines grooves 22 as shown in Figure 5.

It can be seen that if two axially opposed discs or annuli bearing on their opposed faces like sets of grooves constructed as described above, having a smooth ball interposed between each pair of opposed grooves, are slightly rotated, relatively to each other, the balls will roll in a segmental path along the said grooves, thereby effecting axial displacement of the said discs or annuli.

In the embodiment illustrated the annuli 7 and 8 are urged toward the position of minimum axial displacement i. e. balls in the centres of the grooves, by the spring 15. Application of increasing torque to the member 5 will reduce slight relative rotation of the said annuli with consequent axial displacement thereby increasing the axial pressure on the said member.

I claim:

1. In a mechanism including rotary members for transmitting torque by friction under variable ratio drives, the provision of means for automatically varying the axial pressure between said rotary members and including two axially opposed annuli adapted to rotate in unison with the corresponding rotary member and having on their opposed circular faces like sets of circumferentially interengaging segmental grooves the longitudinal axis of which forms a circle round the axis of said annuli, the radial cross-section of the successive grooves forming secants having a predetermined radius and the chord of which is reduced gradually from a maximum at the center of each segmental groove towards a minimum at the cooperating ends of two successive segmental grooves, the outline of each groove along the medial longitudinal cross-section thereof corresponding when developed to the arc of a circle of predetermined radius, and a ball enclosed between each couple of cooperating grooves and the diameter of which is equal to that of the secants forming the cross-section of the latter, the angular shifting of the two annuli with reference to one another producing their axial spacing according to the amplitude of movements of the balls out of their position in register with the central portion of the cooperating grooves and a cage containing said balls and a yielding adjustable stop arrangement for automatically compensating the clearance due to wear between the annuli and balls including a driven member provided with an axial bore tapped at both ends, means yieldingly urging said driven member and corresponding annulus apart, a threaded plug engaging the outer tapped end of said bore, a coil spring one end of which is secured to said plug, a threaded member to which the other end of the spring is secured, screwed inside the inner tapped end of the bore above mentioned and a stop adapted to be urged by the threaded member against the annulus last mentioned.

2. In a mechanism including rotary members for transmitting torque by friction under variable ratio drives, the provision of means for automatically varying the axial pressure between said rotary members and including two axially opposed annuli adapted to rotate in unison with the corresponding rotary member and having on their opposed circular faces like sets of circumferentially interengaging segmental grooves the longitudinal axis of which forms a circle round the axis of said annuli, the radial cross-section of the successive grooves forming secants having a predetermined radius and the chord of which is reduced gradually from a maximum at the center of each segmental groove towards a minimum at the cooperating ends of two successive segmental grooves, the outline of the groove along the medial longitudinal cross-section thereof corresponding when developed to the arc of a circle of predetermined radius, and a ball enclosed between each couple of cooperating grooves and the diameter of which is equal to that of the secant forming the cross-section of the latter, the angular shifting of the two annuli with reference to one another producing their axial spacing according to the amplitude of movements of the balls out of their position in register with the central portion of the cooperating grooves and a cage containing said balls and a yielding adjustable stop arrangement for automatically compensating the clearance due to wear between the annuli and balls including a driven member provided with an axial bore tapped at both ends, means yieldingly urging said driven member and corresponding annulus apart, a recess being provided axially of last mentioned annulus facing said driven member, a threaded plug engaging the outer tapped end of said bore, a coil spring one end of which is secured to said plug, a threaded member to which the other end of the spring is secured, screwed inside the inner tapped end of the bore above mentioned and provided with a recess at the end opposed to the spring, and an elongated stop member the ends of which engage respectively the recesses in the threaded member and annulus.

FELIX PERRUCA.

REFERENCES CITED

The following references are of record in the file of this patent:

UNITED STATES PATENTS

| Number | Name | Date |
| --- | --- | --- |
| Re. 20,801 | Gove et al. | July 19, 1938 |
| 1,585,140 | Erban | May 18, 1926 |
| 1,683,715 | Erban | Sept. 11, 1928 |
| 1,833,475 | Standish | Nov. 24, 1931 |
| 2,100,632 | Chilton | Nov. 30, 1937 |
| 2,123,007 | Hayes | July 5, 1938 |
| 2,123,008 | Hayes | July 5, 1938 |
| 2,132,801 | Perruca | Oct. 11, 1938 |
| 2,445,066 | Hayes | July 13, 1948 |

FOREIGN PATENTS

| Number | Country | Date |
| --- | --- | --- |
| 615,063 | Great Britain | Dec. 31, 1948 |